US008671726B2

(12) United States Patent
Clew et al.

(10) Patent No.: US 8,671,726 B2
(45) Date of Patent: Mar. 18, 2014

(54) DIE CONDITION DETECTION

(75) Inventors: Nicholas Richard Clew, Farmington Hills, MI (US); Peter John Elliot, Novi, MI (US); Stephen Henry Kaminski, Roseville, MI (US)

(73) Assignee: Henrob Limited, Flintshire (GB)

( * ) Notice: Subject to any disclaimer, the term of this patent is extended or adjusted under 35 U.S.C. 154(b) by 516 days.

(21) Appl. No.: 12/921,503

(22) PCT Filed: Mar. 3, 2009

(86) PCT No.: PCT/GB2009/000572
§ 371 (c)(1),
(2), (4) Date: Sep. 8, 2010

(87) PCT Pub. No.: WO2009/112804
PCT Pub. Date: Sep. 17, 2009

(65) Prior Publication Data
US 2011/0016939 A1 Jan. 27, 2011

Related U.S. Application Data

(60) Provisional application No. 61/035,208, filed on Mar. 10, 2008, provisional application No. 61/114,254, filed on Nov. 13, 2008.

(51) Int. Cl.
*B23Q 15/00* (2006.01)
*B21C 51/00* (2006.01)

(52) U.S. Cl.
USPC .......... 72/31.01; 72/3; 72/19.9; 72/453.19; 29/715

(58) Field of Classification Search
USPC ........ 72/3, 16.1, 17.2, 19.9, 20.1, 31.01, 344, 72/453.01, 453.17, 453.19, 481.2; 29/407.01, 407.05, 407.08, 524.1, 29/525.06, 709, 715, 716; 100/918; 425/150
See application file for complete search history.

(56) References Cited

U.S. PATENT DOCUMENTS

| 4,806,913 A | 2/1989 | Schmidt |
| 5,778,516 A * | 7/1998 | Dear et al. ............... 29/715 |

(Continued)

FOREIGN PATENT DOCUMENTS

| DE | 102004002593 | 7/2004 |
| DE | 102005045376 | 2/2007 |

(Continued)

OTHER PUBLICATIONS

International Search Report in PCT/GB2009/000572, dated Oct. 9, 2009 (6 pages).

(Continued)

*Primary Examiner* — Teresa M Ekiert
(74) *Attorney, Agent, or Firm* — Michael Best & Friedrich LLP

(57) ABSTRACT

A die (13, 213, 313) is supported in a die holder (381) such as a frame or an adapter (18, 518) supported in a frame such that it is operational use in a material deforming operation. One or both of the die and the die holder have at least one gas passage which is substantially closed by at least part of the die. Gas such as pressurized air is directed into an end of the gas passage opposite the die via a hose (42, 542) connected to a gas source. If the die is broken or loose leak paths are available for the escape of gas past the die to or from atmosphere. A pressure sensor (41) connected to the hose detects the change in pressure of the gas and the magnitude of that pressure is used to determine the die condition. Alternatively a flow rate sensor is used to detect a change in the flow rate of the gas in order to determine the condition of the die.

44 Claims, 7 Drawing Sheets

(56) References Cited

U.S. PATENT DOCUMENTS

| | | | |
|---|---|---|---|
| 6,058,598 A * | 5/2000 | Dixon et al. | 29/715 |
| 2007/0162250 A1 | 7/2007 | Holden et al. | |

FOREIGN PATENT DOCUMENTS

| | | |
|---|---|---|
| DE | 202007011668 | 1/2008 |
| EP | 1481745 | 1/2004 |
| JP | 54154880 | 12/1979 |
| WO | 2008003311 | 1/2008 |

OTHER PUBLICATIONS

Office Action from the European Patent Office for Application 09720329.3 dated Jun. 11, 2013 (4 pages).

* cited by examiner

DIE CONDITION DETECTION

CROSS-REFERENCE TO RELATED APPLICATIONS

This patent application is a national stage filing under 35 U.S.C. 371 of International Application No. PCT/US2009/000572, filed 3 Mar. 2009, which claims the benefit of priority to U.S. application Ser. No. 61/035,208, filed 10 Mar. 2008, and U.S. application Ser. No. 61/114,254, filed 13 Nov. 2008, the disclosures of each of which are incorporated by reference herein in their entireties. Priority to each application is hereby claimed.

The present invention relates to a method for detecting the condition of a die and also to a die assembly configured to enable detection of the condition of the die. More particularly, but not exclusively, the invention relates to detecting the condition of a die used in a riveting application. The term "condition of the die" is intended to include, amongst other things, damage of the die, a loosely fitted die and the complete absence of a die from a die assembly.

In self-piercing riveting a partially hollow rivet of a particular configuration is inserted into a workpiece such as, for example, one of more sheets of material without full penetration such that a deformed end of the rivet remains encapsulated by an upset annulus of the material. The rivet typically comprises a head and a partially hollow cylindrical shank that terminates in an annular piercing edge.

Self-piercing rivet insertion is generally performed by a hydraulically, pneumatically or electrically operated rivet setting tool that is supported by one arm of a C-frame over a suitably shaped die that is supported by the other arm. The die typically comprises a head defining a die cavity and a depending stem that is received in a bore in the arm of the C-frame. As the rivet is driven into the sheets of material by a punch of the setting tool, the shank pierces the top sheet and then flares outwardly in the die such that the sheet material forms an annulus in the die cavity that encapsulates the shank. The shank of the rivet remains embedded in the sheet material after the rivet has been set thereby forming a "button" on one side of the join. Self-piercing riveting enables sheet material to be joined without the requirement for the pre-drilling or pre-punching of a hole in the material.

The insertion force required to pierce the material in question has to be reacted wholly or at least in part, by the die. In many applications the magnitude of this force will be high and the die is therefore subject to very high loading and wear. On this basis the die needs periodic inspection and replacement. In practice, dies sometimes crack and/or break into pieces. For example, all or part of the head of the die may break away from the stem, or a part of the head may break away with a part of the stem that is directly under it. The life expectancy of a die is dependent on many factors including, for example, the number of riveting cycles to which it is subjected, the rivet setting forces, the material being riveted, the alignment of the die to the workpiece and the actuator punch, the amount of joint expansion into the die cavity, the material properties of the die, the quality of the surface on which the die is supported in the C-frame, the degree of retention of the die in the C-frame and instances of erroneous operation in which the setting tool impacts directly on the die (this can occur inadvertently, for example, when the sheet material and/or rivet are not present above the die either as a result of error or during a test operation).

In an automated riveting system either the C-frame is moved by a robotic arm or the workpiece is moved to the setting tool in a production line environment and a certain amount of quality control is performed by automatic monitoring of the riveting operation. Automated process monitoring systems incorporating transducers of various kinds are currently used in conjunction with riveting systems to monitor various aspects of the riveting operation including, in particular, the position of the rivet, the distanced traveled by the setting tool punch both prior to and during rivet insertion, and the insertion force applied during rivet setting. Such monitoring systems can be configured to deduce that a die is missing by for example detecting when the punch has traveled a distance above a predetermined threshold (i.e. it has traveled to a point beyond where the die would ordinarily be present) before it meets with resistance. However, in instances where a small part of the die breaks away the fault is not always detectable by the process monitoring transducers as the damage to the die often does not significantly affect the distance traveled by the punch or on the force profile applied by the punch. The faulty die can cause unsightly distortion of the sheet material around the rivet insertion location and the strength of the joint may be compromised as a consequence. Moreover, a die that is loose in the C-frame cannot be detected with the currently available process monitoring systems. It will be appreciated that in such circumstances a batch of faulty joints can be generated before they are inspected and intercepted. This not only delays the production process but wastes materials and so there can be a significant cost to the manufacturer.

It is known to use air pressure to check for faults in a die. A sensing head comprising, for example, a disc of nylon with an open chamber therein is presented over the die cavity such that it is sealed against it. Pressurised air is supplied into the sensing head and the pressure of the air in the chamber is detected by a pressure sensor. If the die is broken air is able to escape between the seal in the head and the broken face of the die resulting in a relatively low reading on the pressure sensor. Similarly, if a die is missing this will be detected by a low reading on the pressure sensor. A checking system of this kind works well for dies that are broken or missing but requires accurate robotic positioning equipment to move the sensing head or the C-frame to a position where the sensor head is presented and sealed to the die or at least presented to the die space. Not only does this require an expensive investment in machinery but it also introduces delays into the rivet cycle time. The manufacturer has to balance the quality control benefits provided by performing the checking process at regular intervals against the time it takes. If the checking process reveals a broken or missing die then all the joints performed since the preceding check are potentially faulty and they either have to be checked or scrapped. It is therefore in the interest of the manufacturer to perform the checking process at regular short intervals.

It is not possible for an air pressure checking system of the kind described above to detect a die that is in loose engagement with the C-frame. If a die is loose the mating surfaces of the underside of the die head and the surface of the arm of the C-frame against which it bears can become worn or damaged. This reduces the life expectancy of the die and generally leads to premature die failure. Moreover, if a loose die is used for an extended period it can often fall out of the C-frame and unless its absence is detected immediately the next joint that is made without the die will generally be so poor that the workpiece may have to be scrapped.

It is one object of the present invention, amongst others, to obviate or mitigate at least one of the aforementioned disadvantages and to provide for an improved or alternative method for detecting the condition of a die and to provide for a die assembly that enables such a method to be performed.

According to a first aspect of the present invention there is provided a method for detecting the condition of a die for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change a condition of the die.

The gas may be directed into the at least one passage with a positive gas pressure in which case a change in back pressure is detected to determine the condition of the die. Alternatively a negative gas pressure may be applied to the at least one gas passage and a reduction in the magnitude of the negative pressure or an increase in flow rate may be detected. In each of the cases any suitable gas pressure or flow rate sensor may be used.

By determining the change in the pressure or flow rate in the at least one gas passage conclusions may be made regarding the condition of the die. For example, the method may be used to determine if the die has failed as a result of fracture, cracking or breakage, it may determine that the die is absent completely, that the die is not located properly in the holder, or simply that it is a loose fit in the holder. The method may be performed in such a manner that the determined condition is either indicative of the die being present and operational or that it is not operational in some way. Alternatively, it may be able to make a more refined statement regarding the die condition by identifying why the die is not operational e.g. it may determine from the sensed pressure or flow rate that the die is not present or is broken, or alternatively that the die is a loose fit in the holder.

This aspect of the invention relies on using at least one gas passage in the die holder to apply positive or negative gas pressure to the first end where the die closes the passage. The passage may be closed by means of a sealing member of the die and disposed such that it seals against the die holder (or an intervening member) or simply by means of a tight engagement (e.g. a friction fit) between the die and die holder (or an intervening member). Thus the condition of the die can be determined when it is in place (or at least should be in place) in the die holder rather than having to move and present a separate component associated with a sensor to the die. The pressure or flow rate sensor detects whether there is a change in pressure or flow rate of the gas flow delivered from the source as a result of leakages past the die. The fact that the die serves to close the gas passage means that it seals or at least partly seals the passage so as to prevent or restrict the passage of the gas across it. Thus when a die is correctly fitted to close the passage in the holder the pressure is relatively high in magnitude (whether positive or negative) and the flow rate of the gas is relatively low. If the die becomes loose or damaged, gas may be able to escape past the die more easily, the pressure is reduced and the flow rate increases. In this case if positive pressure is applied to the at least one gas passage the back pressure is reduced or if negative pressure is applied its magnitude is reduced as a result of gas from the surrounding environment entering the at least one passage. In this arrangement, the detection process is not reliant on the presence of a workpiece over the die to determine the die condition. In is to be understood that the at least one gas passage may be partially defined between the die and die holder.

A statement regarding die condition may be determined from comparing an absolute value of pressure or flow rate magnitude of the gas to a predetermined threshold value or simply by detecting a reduction in the pressure magnitude or flow rate compared to a previously measured magnitude.

The gas may be air and the pressure sensor may be an air catch sensor. There may be a source of gas that is proximate to the pressure sensor or otherwise. The gas may be directed to of from the at least one gas passage via a conduit such as, for example, a flexible hose. Alternatively it may be connected directly to the at least one gas passage.

The die may comprise a head defining the die cavity and a stem extending from the head. The stem of the die may be supported in the die holder.

The method may be for detecting the condition of the die in situ in apparatus for deforming material. The die may be supported opposite a deforming tool which may be a rivet setting tool, the rivets being inserted into the material and being upset in the die. The deforming tool and the die may be for self-piercing riveting in which the rivets pierce into the material but do not penetrate all the way therethrough.

According to a second aspect of the present invention there is provided a method for detecting a loose die, the die being of the kind for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change whether the die is loose.

According to a third aspect of the present invention there is provided a die assembly comprising a die having a first surface defining a die cavity in which material is to be deformed, a die holder in which the die is supported such that the die is operational with the die cavity being exposed for receipt of material, at least one gas passage is defined at least partially by the die holder, the at least one gas passage extending to a first end located between the die and the die holder, the first end being sealed substantially closed by at least a portion of the die, the conduit having an outlet in fluid communication with the at least one gas passage and an inlet connectable to a source of pressurised gas, and a sensor for detecting the pressure or flow rate of the gas in the at least one gas passage.

The conduit may be elongate for connection to a remote pressure source. It may be an integral part of a housing of the source of pressurised gas or, alternatively, the source of pressurised gas may be connectable directly or indirectly to the inlet of the conduit. Similarly the sensor may be connected, directly or indirectly, to the inlet of the conduit or it may be connected to any part of the at least one gas passage.

The sensor may be connectable to a controller that is able to determine a condition of the die from the detected magnitude of the pressure or flow rate.

There may be provided at least one further gas passage that extends into the die. The further gas passage may extend to a location that is proximate the die cavity. The die may be a friction fit or otherwise in a recess in the die holder. The at least one further gas passage defined in the die may not extend all the way therethrough and it is closed at its first end by virtue of being a blind passage. In other words it is closed by a portion of the die which is not penetrated by the at least one further gas passage.

The die holder may be defined by part of a frame that supports a setting tool. Alternatively, it may comprise a die adapter between the die and a support member which may be a part of a frame that supports a setting tool. In either case, the frame may be a C-frame with a pair of arms, a first arm being disposed over a second arm in a spaced apart relationship, the first arm supporting a setting tool and a second arm defining the die holder.

The die adapter may comprise a body having a first end and a second end. The die may be supported in the first end and at least of the at least one gas passage may extend between the first and second ends.

The die may comprise a head in which the die cavity is defined and a stem extending from the head in a direction away from the die cavity, the stem of the die being received in a first bore in the first end of the die adapter body.

A first portion of the at least one gas passage may be defined between the stem of the die and the first bore and a second portion of the at least one gas passage extends between the outlet of the conduit and the first portion.

The second portion of the at least one gas passage may be in the form of a second bore.

The first and second bores may be substantially cylindrical with the first bore having diameter that is larger than that of the second bore.

The body may have a flange for seating on the support member.

The second portion of the at least one gas passage may extend from the second end of the die adapter body to the first portion of the at least one gas passage and it may extend from the flange to the first portion. The second portion may comprise a first part that extends from the second end of the die adapter to the first portion of the at least one gas passage and a second part that extends from the flange to the first portion.

There may be a washer disposed between the die head and the die holder. The die head may define a second surface, which is opposite the first surface on which the cavity is defined, the washer being disposed between the second surface and the die holder. The second surface may be immediately adjacent to the die stem. A first surface of the washer may face the second surface of die head and an opposed second surface may face the die holder. The facing surfaces may be in contact. One or both of the first and second surfaces of the washer may define one or more gas paths which may be in the form of a groove (including a recess or the like), the gas paths forming at least part of the at least one gas passage. The washer may have inner and outer peripheral surfaces that extend between the first and second surfaces. There may be provided at least one gas path that extends in a radial direction from the inner peripheral surface towards the outer peripheral surface. There may be a plurality of such radial gas paths that extend from the inner peripheral surface to a substantially annular gas path defined towards the outer peripheral surface.

In one embodiment, the second surface of the die head may define one or more gas paths of the kind defined above. In this particular embodiment the washer need not be present.

There may be a clearance between die stem and a wall that defines the at least one gas passage, the clearance may extend along the length of the die stem so as to provide a gas path. The clearance may be provided by a flat along the length of the die stem or, alternatively by a groove defined along the length of an external surface of the die stem or in the wall that defines the at least one gas passage in which the die stem is received.

In one embodiment a sleeve is provided over the outer periphery of the washer and the die head, the sleeve being deformable outwardly. In this embodiment the washer may have one or more gas paths defined on its first surface only. The gas paths may comprise one or more radial grooves that extend from the inner peripheral surface to the outer peripheral surface. In the event of die breakage the sleeve is deformed outwardly by the broken part of the die so as to provide a clearance between the sleeve and the die head. In use, this affords a leak path as the gas flows along the gas path or paths, along the clearance to atmosphere thereby resulting in a drop in back pressure or an increase in the flow rate detected by the sensor. Alternatively, in the instance where a negative suction pressure is applied the gas flows from atmosphere into the clearance and along the at least one gas passage.

The die may be fixed in the die holder by means of a fixing member such as a grub screw or the like. The fixing member is located in a fixing bore in the die holder which may be in gas communication with the at least one gas passage such that if the fixing member is not present or is only loosely fitted the fixing bore provides a leakage flow path. The amount of leakage determined from the detected back pressure or flow rate may be of such a value that it can be attributed to this condition (i.e. the absence or incorrect fitting of the fixing member).

In one embodiment the die may comprise at least two separable parts: a die stem and a collar. The die stem may have a flange on which the collar is mounted. The collar may have a depending skirt that extends over at least a part of the depth of the flange. The die stem may have a gas bleed passage for gas communication with the at least one gas passage. The gas bleed passage may extend from an interface between the die holder and the die to an interface between the die stem and the collar. It may extend across the depth of the flange. The die stem may have an upper surface defining a part of the die cavity, the upper surface may define a die protrusion or nub that serves to guide flaring of the rivet during deformation. The collar may have an inner annular surface that defines a part of the die cavity.

Specific embodiments of the present invention will now be described, by way of example only, with reference to the accompanying drawings in which.

Figure 1:
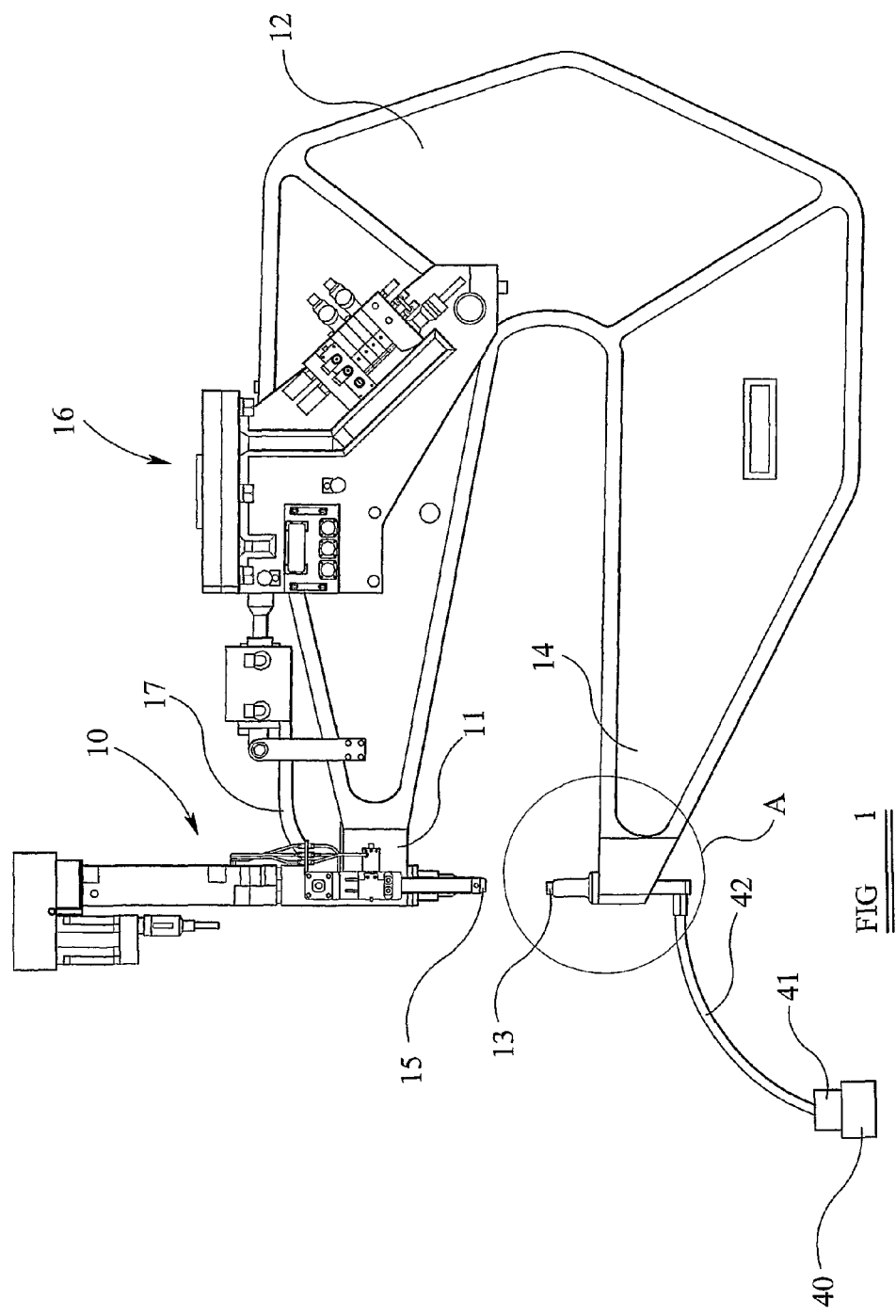
FIG. 1 is a side view of rivet setting apparatus including a rivet setting tool supported over a die assembly in a C-frame, in accordance with the present invention.

Referring now to FIG. 1 of the drawings, a rivet setting tool 10 is mounted on an upper arm 11 of conventional C-frame 12 above a rivet-upsetting die 13 supported in the lower arm 14. Rivets (not shown in FIG. 1) are inserted by the tool 10 into a workpiece (not shown) supported over the die 13 as is well known in the art. The tool 10 is operable such that a lower nose end 15 moves downwards to engage and optionally clamp the workpiece and then a punch is extended so as to insert the rivet. It is to be appreciated that whilst the specific embodiment described herein relates to the insertion of rivets it has application to the formation of other joints including joints using other fasteners that are inserted into a work piece using a die such as, for example, slugs, and also a clinching operation in which a punch of the setting tool is used directly to deform the material into the die to form a mechanically interlocked joint which may or may not then be supplemented with a fastener.

The C-frame 12 is mounted on a robot manipulator (not shown) such that it is movable with the tool 10 by the robot towards and away from the workpiece as required. A mounting bracket 16 is provided on the C-frame 12 for connection to the robot manipulator. A suitable rivet delivery system (not shown) is provided and is designed to supply rivets to the setting tool in a predetermined and controllable fashion from a bulk source (not shown). This may be achieved by, for example, using a compressed gas delivery system that propels the rivets along a tube or track or by a tape drive system in which rivets are supported in a tape that is wound on a spool and fed to the setting tool. The tool and feed apparatus are operated by a controller (not shown in the figures) in the form of microprocessor-based hardware and operational software. Such rivet delivery and control systems are well known and will not therefore be described herein.

Figure 2:
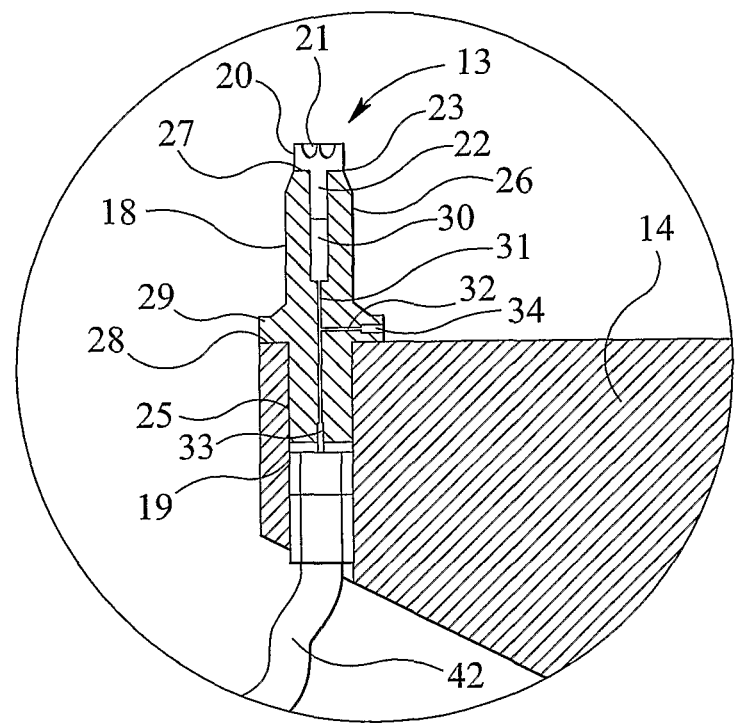
FIG. 2 is a sectioned view through that part of the apparatus of FIG. 1 that is encircled and labelled A.

The die 13 shown in FIGS. 1 and 2 is of conventional configuration but is supported on the lower arm 14 of the C-frame 12 by a die holder adapter 18 that is received in a bore 19 through the arm 14. The die 13 is generally cylindrical with a head 20 defining an open die cavity 21 for facing the setting tool 10 and a depending stem 22 that is of reduced diameter compared to the head 20 such that an annular surface 23 extending radially relative to the central axis of the die is defined on the underside of the head 20. The adapter 18 has a generally cylindrical body with a first end 25 that is received in a snug fit in the bore 19 in the arm 14 of the C-frame 12 and a second hollow end 26 that receives the die stem 22 such that the annular surface 23 of the die is seated on an upper surface 27 of the second end 26. A sealing member such as, for example, a O-ring or the like may be provided between the adapter 18 and an upper surface 28 of the surface of the arm 14 in which the bore 19 is defined. The adapter body has a radially outward extending flange 29 defined part way along its outer surface with one of the radially extending faces being seated on the upper surface 28 of the arm 14 immediately around the bore 19. The second hollow end 26 is tapered inwardly and terminates in the annular upper surface 27 on which underside surface 23 of the head 20 is supported. A cylindrical bore 30 extends within the adapter body from the second end 26 to a position substantially half way along its length and receives the die stem 22 in a slip fit or friction fit. The body is also penetrated by two small diameter passages: a first 31, which extends along a central longitudinal axis of the body from the first end 25 to the cylindrical bore 30, and a second 32 that extends radially from the first passage 31 to the periphery of the flange 29. In each case the passages have respective enlarged first and second entry ports 33, 34 to allow connection to a hose for the supply of pressurised air.

In FIGS. 1 and 2, the first entry port 33 of the die adapter 18 is connected to a pneumatic source 40 and an air catch sensor 41 via a suitable air hose 42. The sensor 41 has an outlet nozzle that is connected to an inlet end of the hose 42 and delivers air to the adapter 18. The sensor 41 is operative to detect decreases in the air pressure flow from the outlet nozzle as a result of the reduction in back pressure as a result of leakage paths caused by the absence of all or part of the die 13 in the adapter 18, or simply by virtue of a loose fitting die. Air catch sensors of this kind are known in the art and a suitable example for this application is available from SMC Corporation of Tokyo, Japan such as, for example, those available under general part no. ISA 2. An alternative sensor for sensing the flow rate of the gas may be used instead.

Under normal operation, when a die 13 is present and secured in place in the adapter 18 the air catch sensor 41 will detect a relatively high back pressure in view of the close fit and/or sealed relationship between the die 13, the adapter 18 and the arm 14 of the C-frame 12. If the die 13 is absent the back-pressure will be negligible as air is able to leak out through the small diameter passages 30, 31 to atmosphere. The lack of significant back-pressure is detected by the sensor 41 and a signal indicative of the absence of the die 13 is generated and transmitted to the controller which can issue an alarm. Alternatively, if part of the die head 20 is missing, the die 13 is only loosely fitted in the adapter 18, or the adapter 18 is loosely fitted in the bore 19, the leak flow path is less restricted than normal and a back pressure of reduced magnitude is sensed. A signal indicative of a broken or faulty die is then generated and transmitted to the controller so that a suitable alarm can be generated.

The configuration of the assembly of the die 13 and the die holder adapter 18 allows a statement to be made regarding the condition of the die either by comparing an absolute value of the sensed back-pressure magnitude with a predetermined threshold value or simply by detecting a reduction (of a predetermined magnitude) in the back-pressure compared to a previously measured magnitude.

It is to be appreciated that if the bore 19 in the lower arm 14 of the C-frame is modified to provide an air-tight connection with the end of the hose 42 the die holder adapter 18 may be eliminated in certain embodiments in which case the lower arm of the C-frame in the region around the bore 19 serves to hold the die directly.

Figure 3:
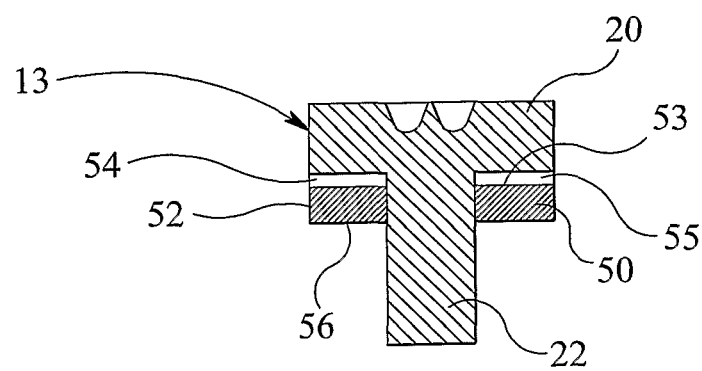
FIG. 3 is a sectioned side view of a die shown with a washer support in accordance with the present invention.
Figure 4:
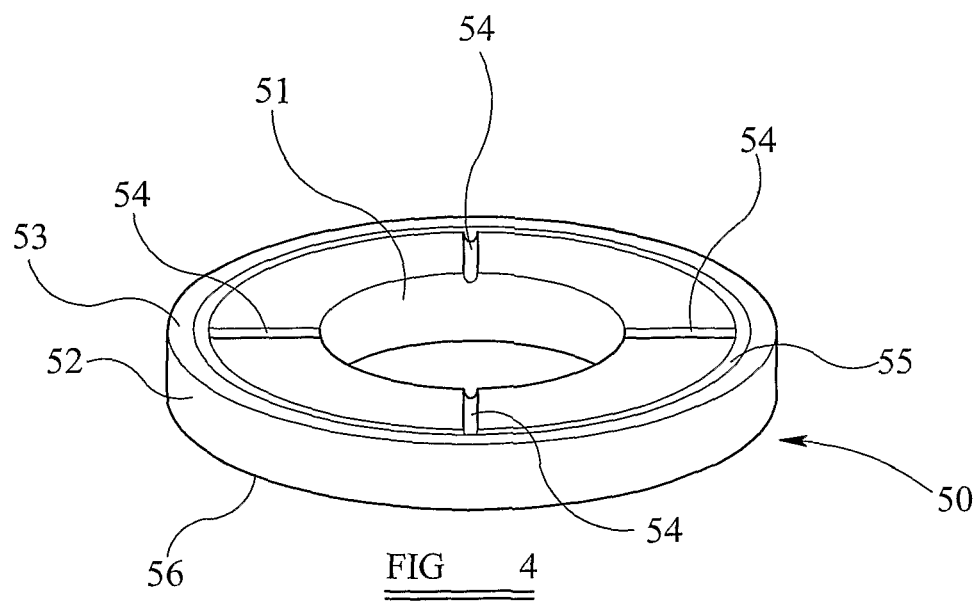
FIG. 4 is a perspective view of the washer support of FIG. 3.

An alternative die arrangement is depicted in FIGS. 3 and 4. This embodiment can be used with the die adapter 18 of FIGS. 1 and 2 or can be mounted directly into a reduced diameter bore in the lower arm of the C-frame without an adapter. The die 13 is supported on an annular washer 50 having an inner edge 51, an outer peripheral edge 52, an upper surface 53 (for facing the die) that has a plurality of shallow channels 54, 55 formed therein and a lower surface 56 for abutment with the adapter 18 or the arm 14 of the C-frame 11. In the particular embodiment shown in the figures, there are four substantially radial channels 54 that extend from the inner edge 51 to a circular channel 55 formed towards the outer peripheral edge 52 of the washer 50. In use the channels 54, 55 are in communication with the air supply via the hose 42, the small diameter passages 31, 32 and bore 30 in the adapter 18 (if present) and a leak passage or clearance past the die stem. They thus provide a potential air leak path that runs close to the outer periphery of the die head 20. If the die 13 is present and its annular surface 23 is sealed in place against the periphery of the upper surface 53 of the washer 50 the air channels 54, 55 are effectively closed by the die as they are not in fluid communication with the atmosphere and negligible air leakage occurs. On the other hand, if a fracture takes place at the head 20 of the die 13 in a radial position that is distal from the die stem 22 then, provided the missing part of the die head 20 encompasses the annular surface 23 on the underside of the die head 20, air can leak past the die 13 and a reduced back pressure (or an increased flow rate if a flow rate sensor is used) is detected. Similarly, if the die is loosely fitted air can leak past resulting in a reduced back pressure and increase flow rate. It will be appreciated that the washer 50 may have a similar array of channels 54, 55 formed on its lower surface 56 if desired so that it does not matter which way up it is installed. The washer could be retro-fitted or may be supplied pre-attached to each die.

Figure 5:
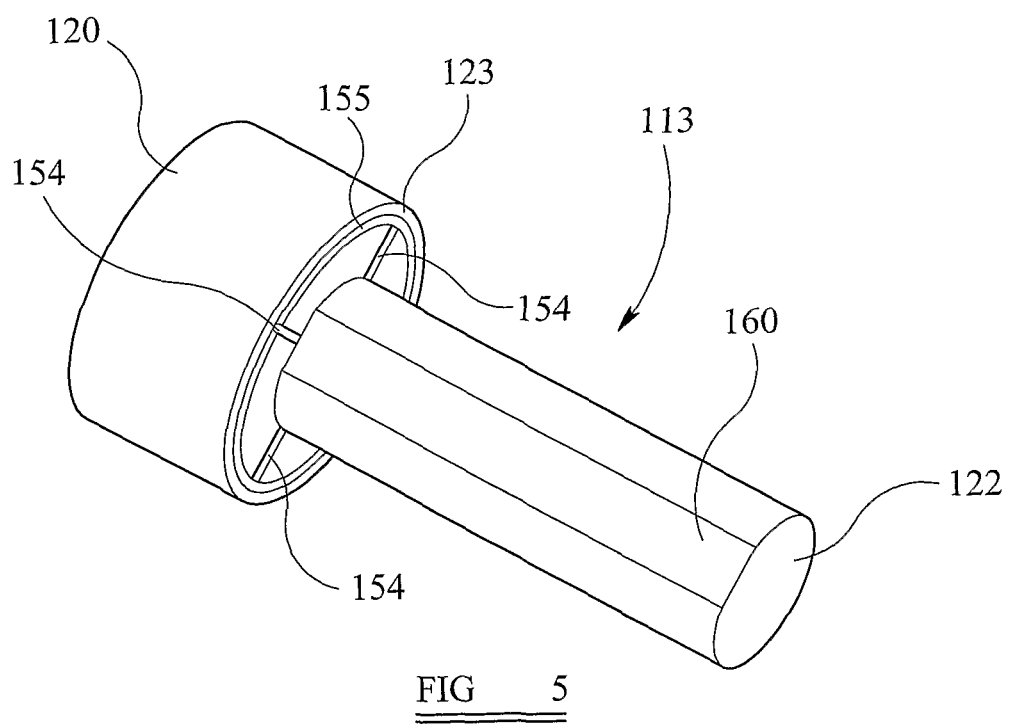
FIG. 5 is a perspective view of an alternative embodiment of the die in accordance with the present invention.

In a further die embodiment 113 shown in FIG. 5, the channels 154, 155 are formed in the annular surface 123 on the underside of the die head 120. This die 113 may be used with the adapter 18 or mounted directly into the bore 19 of the C-frame arm 14 as before. In addition, this particular die 113 is shown with a flat surface 160 along the length of its stem 122. Once the die 113 is supported in the cylindrical bore 30 of the adapter 18 or in the bore 19 of the C-frame arm 14 the clearance between the flat 160 and the wall of the bore 30 or 19 affords a leak path to allow air to flow up to the channels 154, 155. This feature may be incorporated in any of the die embodiments shown in the figures. It will be appreciated that the flat 160 may be replaced with a groove, recess, channel or the like in the surface of the stem to allow for the flow of air.

Figure 6:
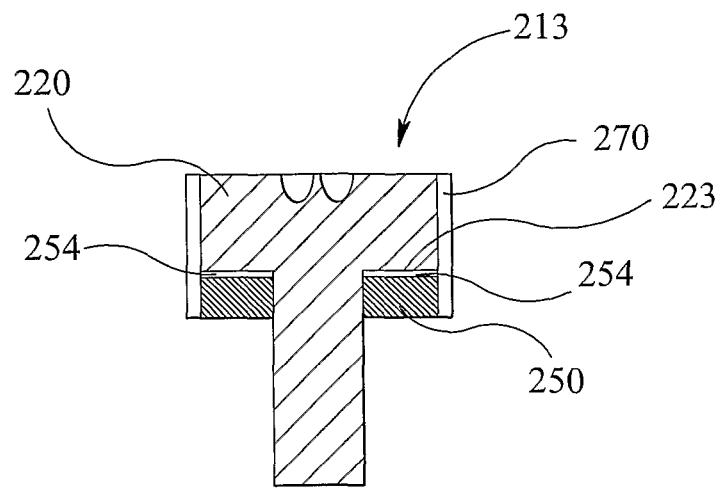
FIG. 6 is a sectioned side view of a second alternative embodiment of a die and support in accordance with the present invention.
Figure 7:
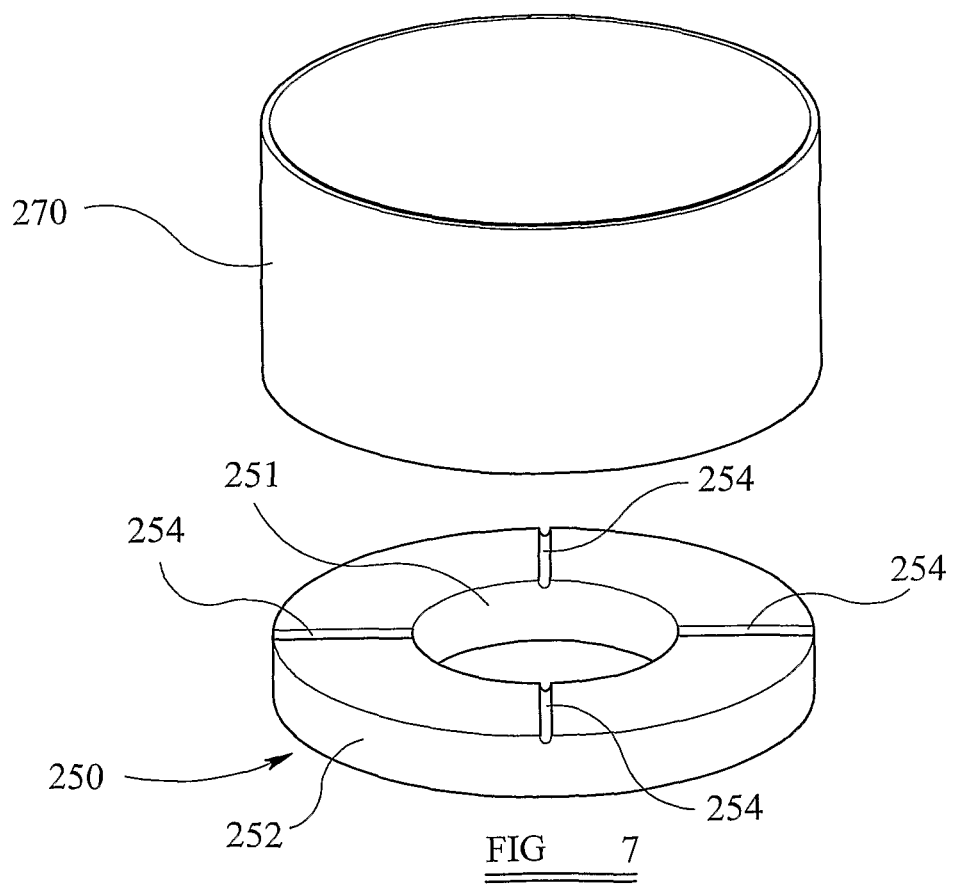
FIG. 7 is a perspective exploded view of the support of FIG. 6.

The embodiment of FIGS. 6 and 7 comprises a die 213 with a washer 250 similar to that of FIGS. 3 and 4. However, in this instance the radial channels 254 in the upper surface of the washer run between the inner and outer peripheral edges 251, 252 and there is no circular channel. A thin metallic cylindrical sleeve 270 is press-fitted over the outer peripheral edges of the washer 250 and the die head 220 so as to close the channels 254. In the event of breakage of the die head 220 the sleeve 270 will be deformed outwards so as to provide a clearance between the die head 220 and the sleeve 270, thereby allowing a leak path to open. The air leak path thus travels from the supply, through the hose 42, the small diameter bores 31, 32 and bore 30 in the adapter 18, the channels 254 in the washer and between the die head 220 and the sleeve 270 (or between the broken parts of the die head). This arrangement has the benefit that breakage may be detectable even if it does not extend to the annular surface 223 on the underside of the die head. Moreover, the sleeve 270 helps to retain the broken die parts and may serve to prevent the rivet joint from distorting to an extent where it is unsatisfactory. The sleeve 270 may be replaced by a tightly wound coil spring or the like.

Figure 8:
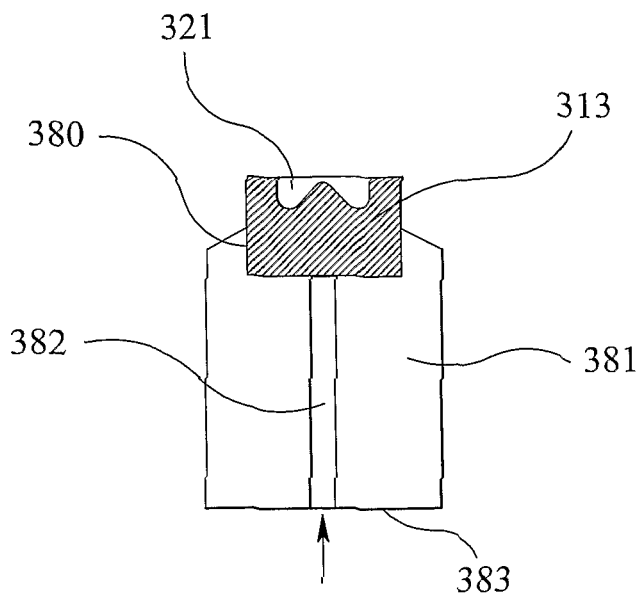
FIG. 8 is a sectioned side view of a third alternative embodiment of a die and die holder in accordance with the present invention.

In the embodiment of FIG. 8, the die 313 has no stem and the head 320 is received in a recess 380 in a die holder 381 in a tight fit such as a friction, press or slip fit. Alternatively or in addition it may be retained in the recess 380 by a suitable screw. As before, the die has an upper surface for facing the setting tool and in which a die cavity 321 is formed. The holder 381 may be an adapter for fitting in a bore in the C-frame as in the manner of the embodiment shown in FIGS. 1 and 2 or may, alternatively, be an integral part of the C-frame. The length of the die holder 381 is penetrated by a bore 382 that extends between the recess 380 and an opposite end 383. In use the bore 382 is connected, directly or indirectly, to pneumatic source and an air catch sensor via a suitable air hose as in the preceding embodiments. In order to detect whether die failure has occurred air is directed into the bore 382 as indicated by the arrow.

Figure 9:
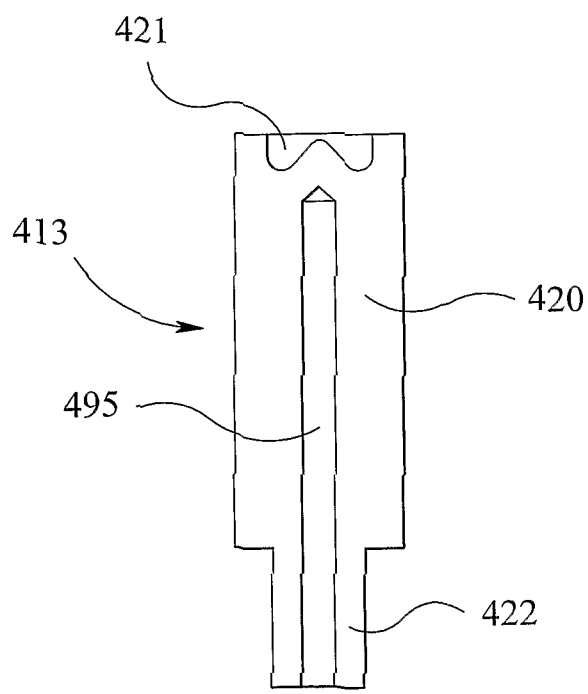
FIG. 9 is a section side view of a fourth alternative embodiment of a die in accordance with the present invention.

FIG. 9 illustrates an alternative die configuration in which the die 413 itself is penetrated by a passage for connection to the sensor. The die may take any suitable form but in this particular embodiment the die has an elongated head portion 420, an upper surface of which defines the die cavity 421, and a short stem 422 for receipt in a recess or bore in a die holder (not shown) being either an adapter or part of the C-frame. A single passage 495 extends up the stem 422 and the head 420 along a longitudinal axis of the die and terminates a short distance from the die cavity 4. In use, the passage is in fluid communication with the fluid passage and/or bore in the die adapter or C-frame and therefore with the pneumatic source and air catch sensor. More than one passage 422 may be provided and it will be appreciated that the precise configuration of the passage or passages may vary. If this die should fracture in the region around or under the die cavity 421 it will expose the passage or passages in the die thereby affording leakage. The reduction in back pressure or increase in flow rate will be detected as before so that a die condition statement can be made.

In all embodiments the sensor may located at any convenient location which may be proximate the die and the die holder or may be distal therefrom. If the C-frame and setting tool are robot-mounted it may be convenient for the pressure sensor to be located outside of the robot cell.

The source of pressurised gas may be connected directly to a gas passage in the C-frame or in the die adapter rather than using an elongate flexible conduit.

Figures 10, 11:
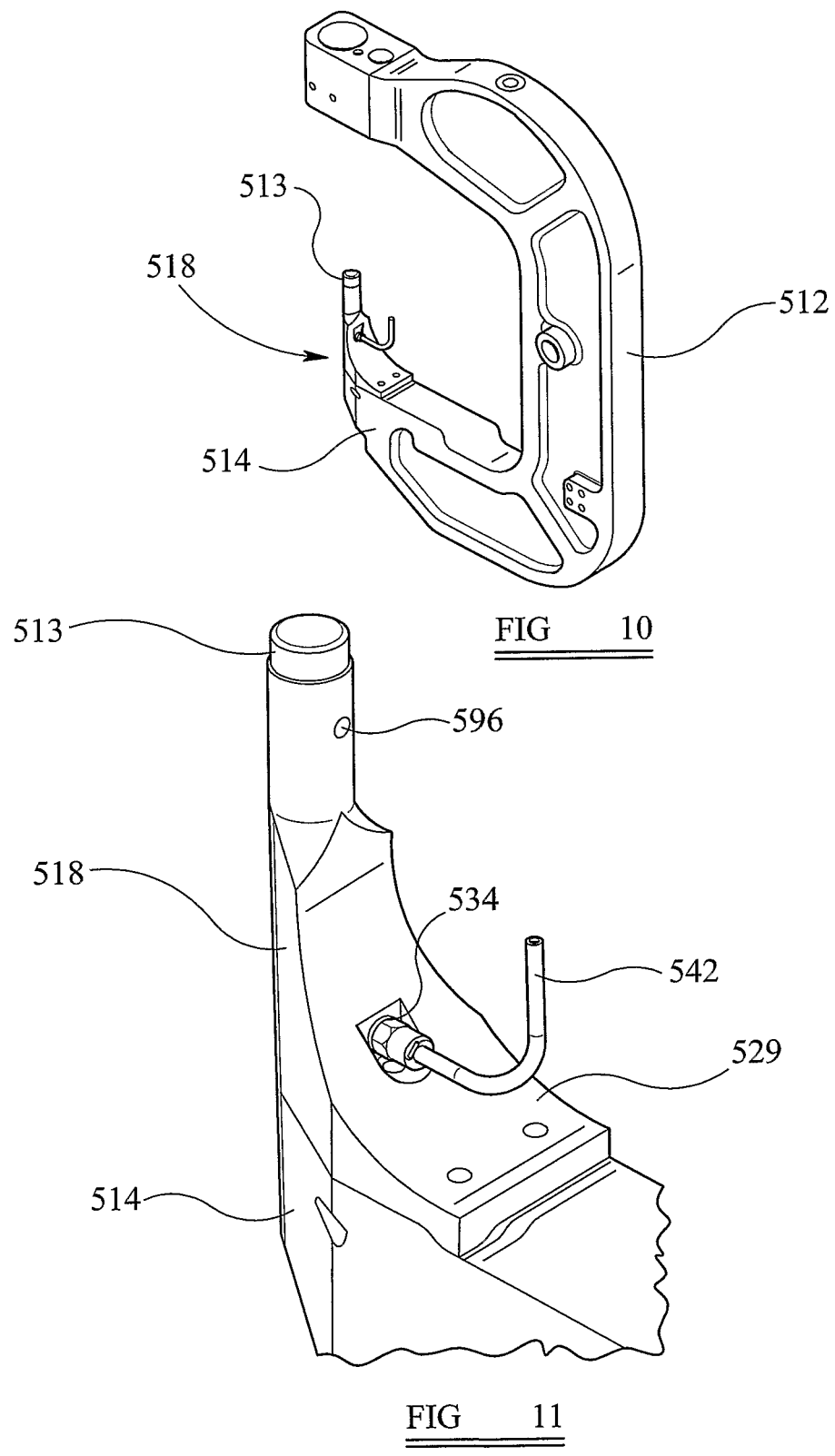
FIG. 10 is a perspective view of a C-frame fitted with a die and die holder in accordance with the present invention.
FIG. 11 is an enlarged view of the die and die holder of FIG. 10.

A further alternative embodiment of a die adapter is shown in FIGS. 10 and 11. In this embodiment the die holder (adapter) 518 is fixed to the lower arm 514 of the C-frame 512 at a bottom flange 529 and extends upwardly to an open end in which the die 513 is received so as to close the internal gas flow passages (not shown). The flange 529 has an upper arcuate surface that merges with an upper end of the die holder 518. The die 513 is retained tightly in place in the adapter 518 by a grub screw 596 that extends through the wall of the adapter. Gas in introduced into the adapter 518 at a side port 534 in the arcuate surface of the flange via a flexible hose 542 connected thereto. The port 534 is in fluid communication with the gas passage that extends to the die 513 as before. If the grub screw 596 is omitted it leaves a gas leakage path to atmosphere which would be detected by sensing a reduction in the back pressure or an increase in the gas flow rate. It is to be understood that the grub screw feature may be used in conjunction with the die adapters described in preceding embodiments.

Figure 12:
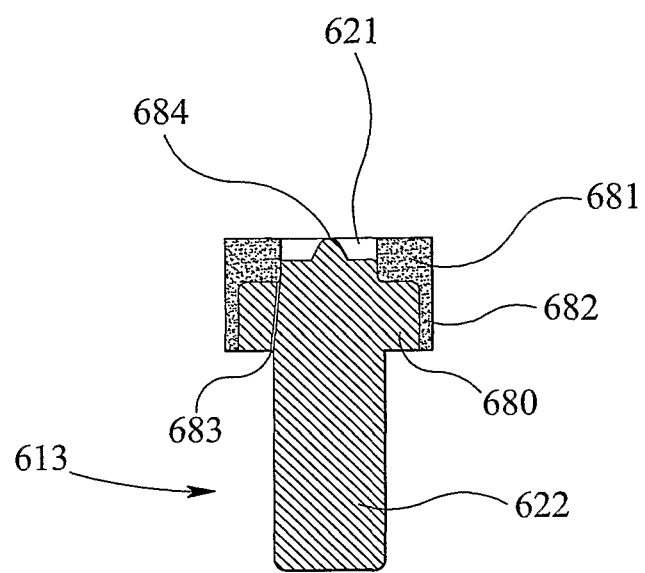
FIG. 12 is a sectioned side view of a further alternative embodiment of a die in accordance with the present invention.

In FIG. 12 there is shown an alternative die embodiment for insertion into a die holder of any of the kinds described above. This particular die 613, is in two parts, with a stem 622 having a radially outwards extending flange 680 that supports an annular collar 681. An upper surface of the stem 622 and an inner surface of the collar 681 combine to define the die cavity 621. The collar 681 has a depending skirt 682 that is substantially coterminous with the depth of the flange 680 and ensures the collar is securely mounted on the stem 622. In order to detect whether die failure has occurred gas is directed through a gas passage in the holder and into a bleed hole 683 defined in the flange 680 of the stem 622. The bleed hole 683 extends across the depth of the flange 680 from the interface with the die holder to an interface with the collar 681. The upper surface of the stem 622 may define a protrusion, pip or nub 684 that is designed to ensure that the rivet is upset appropriately during rivet insertion and deformation of the workpiece.

The two-part die configuration of FIG. 12 is designed particularly to avoid premature die failure.

Initial tests conducted by the applicant have established that being able to detect a loose die and take suitable remedial action (i.e. tightening, re-fitting or re-sealing the die) has prolonged the life expectancy of the die considerably and in excess of expectations.

In all embodiments described above the pressure sensor or flow meter sensor may be arranged in line with the hose 42, 542 upstream of the gas passage (or passages) in the die holder or may be located downstream of the gas passage(s). It the latter case there may be an outlet port provide in the gas passage to which the sensor is connected via a flexible conduit if necessary.

In an alternative arrangement the gas pressure applied is a negative pressure or suction e.g. by applying a vacuum. In the event of a leak between the die and the die holder, the magnitude of the negative pressure decreases and the flow rate increases. An appropriate sensor may sense either of these.

It will be appreciated that numerous modifications to the above described design may be made without departing from the scope of the invention as defined in the appended claims. For example, the shape of the die may take any suitable form. The leak paths afforded by the channels in the embodiments described above may be provided by any suitable form of grooves in the relevant surfaces of the washer or die, including recesses or the like. Moreover, particular shape of the adapter and the passages and bore may take any suitable form. Furthermore, the die cavity may take any appropriate form including that suitable for clinching.

The invention claimed is:

1. A method for detecting the condition of a die for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change a condition of the die.

2. A method according to claim 1, wherein the die comprises a head in which the die cavity is defined and a die stem extending from the head in a direction away from the cavity, further comprising supporting the die stem in a bore in the die holder and applying the gas at a second end of the at least one gas passage.

3. A method according to claim 1, wherein there is provided a further at least one gas passage defined in the die.

4. A method according to claim 1, further comprising using an air catch sensor to detect the change in pressure of the gas.

5. A method according to claim 1, further comprising directing the gas to the at least one gas passage via a conduit by connecting an outlet of the conduit to the at least one gas passage and connecting an inlet of the conduit to a source of pressurised gas.

6. A method according to claim 5, further comprising connecting a sensor to the inlet of the conduit for detecting the change in at least one of the gas pressure or the flow rate.

7. A method according to claim 1, wherein the die is a riveting die for upsetting a rivet inserted into the material.

8. A method according to claim 1, wherein the gas is applied to the at least one gas passage when the die is situated in an apparatus for deforming material.

9. A method according to claim 1, wherein the at least one gas passage has a first portion defined by the die holder and a second portion defined between the die and the die holder, the first end being defined at the end of the second portion.

10. A method for detecting a loose die, the die being of the kind for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change whether the die is loose.

11. A method for manufacturing a riveted joint by inserting a rivet into material, the method comprising:
   providing a die assembly comprising a die having a first surface defining a die cavity in which material is to be deformed, a die holder in which the die is supported such that the die is operational with the die cavity being exposed for receipt of material, at least one gas passage being defined at least partially by the die holder, the at least one gas passage extending to a first end located between the die and the die holder, the first end being sealed substantially closed by at least a portion of the die;
   supplying pressurised gas from a source to an inlet of a conduit having an outlet in fluid communication with the at least one gas passage;
   driving the rivet into the material and towards the die such that a shank of the rivet pierces the to sheet and then flares outwardly in the die such that the material forms an annulus in the die cavity that encapsulates the shank; and
   detecting the pressure or flow rate of the gas in the at least one gas passage using a sensor.

12. A die assembly comprising a die having a first surface defining a die cavity in which material is to be deformed, a die holder in which the die is supported such that the die is operational with the die cavity being exposed for receipt of material, at least one gas passage is defined at least partially by the die holder, the at least one gas passage extending to a first end located between the die and the die holder, the first end being sealed substantially closed by at least a portion of the die, a conduit having an outlet in fluid communication with the at least one gas passage and an inlet connectable to a source of pressurised gas, and a sensor for detecting the pressure or flow rate of the gas in the at least one gas passage.

13. A die assembly according to claim 12, wherein the die holder comprises a die adapter disposed between the die and a support member.

14. A die assembly according to claim 13, wherein the die adapter comprises a body having a first end in which the die is supported and a second end, at least part of the at least one gas passage extending between the first and second ends.

15. A die assembly according to claim 14, wherein the die comprises a head in which the die cavity is defined and a stem extending from the head in a direction away from the die cavity, the stem of the die being received in a first bore in the first end of the die adapter body.

16. A die assembly according to claim 15, wherein a first portion of the at least one gas passage is defined between the stem of the die and the first bore and a second portion of the at least one gas passage extends between the outlet of the conduit and the first portion.

17. A die assembly according to claim 16, wherein the second portion of the at least one gas passage is in the form of a second bore.

18. A die assembly according to claim 17, wherein the first and second bores are substantially cylindrical with the first bore having diameter that is larger than that of the second bore.

19. A die assembly according to claim 16, wherein the second portion of the at least one gas passage extends from the second end of the die adapter body to the first portion of the at least one gas passage.

20. A die assembly according to claim 19, wherein the second portion of the at least one gas passage extends from the flange to the first portion.

21. A die assembly according to claim 19, wherein the second portion comprises a first part that extends from the second end of the die adapter to the first portion of the at least one gas passage and a second part that extends from the flange to the first portion.

22. A die assembly according to claim 15, further comprising a washer disposed between the die head and the die holder.

23. A die assembly according to claim 22, wherein the die head defines the second surface, the washer being disposed between the second surface and the die holder.

24. A die assembly according to claim 23, wherein the second surface is immediately adjacent to the die stem.

25. A die assembly according to claim 23, wherein the washer has a first surface that faces the second surface of die head and an opposed second surface that faces the die holder.

26. A die assembly according to claim 25, wherein one or both of the first and second surfaces of the washer defines at least one gas path which forms part of the at least one gas passage.

27. A die assembly according to claim 26, wherein the at least one gas path is in the form of a groove defined in the surface or surfaces.

28. A die assembly according to claim 27, wherein the washer has inner and outer peripheral surfaces that extend between the first and second surfaces of the washer and at least one gas path that extends in a direction from the inner peripheral surface towards the outer peripheral surface.

29. A die assembly according to claim 28, wherein the at least one gas path extends in a substantially radial direction.

30. A die assembly according to claim 29, wherein the at least one gas path comprises at least one first gas path and a second gas path, the at least one gas path extends between the inner peripheral surface and the second gas path comprises a substantially annular gas path defined towards the outer peripheral surface.

31. A die assembly according to claim 23, where the second surface of the die head defines at least one gas path that extends from a position adjacent to the stem to an outer periphery of second surface.

32. A die assembly according to claim 31, wherein the at least one gas path comprises a groove defined in the second surface.

33. A die assembly according to claim 22, wherein a sleeve is provided over the outer periphery of the washer and the die head, the sleeve being deformable outwardly.

34. A die assembly according to claim 14, wherein the body of the die adapter has an outwardly extending flange that is seated on the support member.

35. A die assembly according to claim 15, wherein the at least one gas passage is defined at least in part by a clearance between the stem of the die and a wall defining the first bore, the clearance extending along the length of the stem.

36. A die assembly according to claim 35, wherein the clearance provided by a flat defined along the length of the stem of the die.

37. A die assembly according to claim 12, wherein the die holder is defined by part of a support frame that supports the die.

38. A die assembly according to claim 37, wherein a support member is part of the support frame.

39. A die assembly according to claim 12, wherein the sensor is connected to the inlet of the conduit.

40. A die assembly according to claim 12, wherein the die is a riveting die in which a rivet for insertion into the material is upset.

41. A die assembly according to claim 12, in combination with a frame for supporting a setting tool over the die assembly, wherein the die holder is provided by at least part of the frame.

42. A die assembly and frame combination according to claim 41, wherein the frame is a C-frame having first and second arms, the first arm being disposed over the second arm in a spaced apart relationship, the first arm for supporting a setting tool and a second arm defining the die holder.

43. A die assembly according to claim 12, wherein the die comprises a stem and a separable collar, the die cavity being defined between the stem and collar, at least one gas bleed passage being defined in the stem.

44. A die assembly according to claim 43, wherein the stem has a flange on which the collar is supported and the at least one gas bleed passage is defined in the flange.

* * * * *

UNITED STATES PATENT AND TRADEMARK OFFICE
CERTIFICATE OF CORRECTION

| | | |
|---|---|---|
| PATENT NO. | : 8,671,726 B2 | Page 1 of 1 |
| APPLICATION NO. | : 12/921503 | |
| DATED | : March 18, 2014 | |
| INVENTOR(S) | : Nicholas Richard Clew et al. | |

It is certified that error appears in the above-identified patent and that said Letters Patent is hereby corrected as shown below:

In the Claims

Column 12, claim 11, line 33:   replace the word "to" with the word --top--

Signed and Sealed this
Ninth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,671,726 B2                                               Page 1 of 1
APPLICATION NO.   : 12/921503
DATED             : March 18, 2014
INVENTOR(S)       : Clew et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Twenty-ninth Day of September, 2015

Michelle K. Lee
*Director of the United States Patent and Trademark Office*